United States Patent
Evans

Patent Number: 5,927,446
Date of Patent: Jul. 27, 1999

[54] SLIDE PIN BUSHING AND BOOT SEAL ASSEMBLY FOR DISC BRAKE ASSEMBLY

[75] Inventor: Anthony C. Evans, Northville, Mich.

[73] Assignee: Kelsey-Hayes Company, Livonia, Mich.

[21] Appl. No.: 08/745,617

[22] Filed: Nov. 7, 1996

Related U.S. Application Data

[60] Provisional application No. 60/006,291, Nov. 7, 1995.

[51] Int. Cl.⁶ ..................................................... F16D 65/09
[52] U.S. Cl. ..................................... 188/73.44; 188/73.45
[58] Field of Search .............................. 188/73.44, 73.45; 277/212 FB; 92/98 D

[56] References Cited

U.S. PATENT DOCUMENTS

| | | | |
|---|---|---|---|
| 4,027,750 | 6/1977 | Kawamoto et al. | 188/73.45 |
| 4,144,952 | 3/1979 | Nakayama | 188/73.45 |
| 4,200,173 | 4/1980 | Evans et al. | 188/73.45 |
| 4,222,464 | 9/1980 | Moriya et al. | 188/73.44 |
| 4,265,340 | 5/1981 | Scott et al. . | |
| 4,308,938 | 1/1982 | Denton . | |
| 4,327,925 | 5/1982 | Alexander et al. | 188/73.44 |
| 4,331,221 | 5/1982 | Evans et al. . | |
| 4,334,598 | 6/1982 | Portolese | 188/73.44 |
| 4,401,194 | 8/1983 | Klassen . | |
| 4,570,760 | 2/1986 | Schmidt | 188/73.44 |
| 4,753,326 | 6/1988 | Weiler et al. . | |
| 4,807,725 | 2/1989 | Weiler et al. | 188/73.44 |
| 4,926,979 | 5/1990 | Odaka . | |
| 5,183,136 | 2/1993 | Maeda et al. . | |
| 5,299,665 | 4/1994 | Weiler et al. . | |
| 5,358,079 | 10/1994 | Brown . | |

FOREIGN PATENT DOCUMENTS

| | | | |
|---|---|---|---|
| 0009771 | 1/1977 | Japan | 188/73.44 |
| 0157832 | 9/1982 | Japan | 188/73.44 |
| 2095776 | 10/1982 | Japan | 188/73.45 |

*Primary Examiner*—Chris Schwartz
*Attorney, Agent, or Firm*—MacMillan, Sobanski & Todd, LLC

[57] ABSTRACT

An improved structure for a slide pin bushing and boot seal assembly for use in a vehicle disc brake caliper assembly adapted to selectively frictionally engage a rotor connected to a vehicle wheel includes an anchor plate adapted to be secured to a stationary component of the vehicle, and a caliper secured to the anchor plate for sliding movement relative thereto. A pair of brake shoes are carried by the disc brake caliper assembly, and an actuation means is provided for selectively moving the brake shoes axially toward and away from one another so as to selectively frictionally engage the rotor. The slide pin bushing and boot seal assembly is carried by the disc brake caliper assembly and includes a slide pin bushing formed from a relatively hard resilient elastomeric material and a boot seal formed from a relatively soft flexible elastomeric material and joined to one end of the slide pin bushing to define an integral one-piece unit. A slide pin extends through the boot seal and at least a portion of the slide pin bushing for securing the caliper to the anchor plate for sliding movement relative thereto.

13 Claims, 6 Drawing Sheets

SLIDE PIN BUSHING AND BOOT SEAL ASSEMBLY FOR DISC BRAKE ASSEMBLY

CROSS-REFERENCE TO RELATED APPLICATIONS

This application claims the benefit of U.S. Provisional Application No. 60/006,291, filed Nov. 7, 1995.

BACKGROUND OF THE INVENTION

This invention relates in general to vehicle disc brake assemblies and in particular to an improved structure for a slide pin bushing and boot seal assembly adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to the wheel of the vehicle for rotation therewith. A caliper assembly is slidably supported by pins secured to an anchor plate. The anchor plate is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from opposed braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

As mentioned above, the caliper assembly is slidably supported by pins secured to the anchor plate. A typical pin includes a non-threaded main body and threaded end. The main body of the pin extends into a non-threaded aperture formed in the anchor plate, and the threaded end of the pin is received in threaded opening provided in the caliper assembly. Since the pins slidably support the caliper assembly relative to the anchor plate, it is important that the caliper assembly is sufficiently supported by the pins while still being able to freely slide. It is known to insert a pin bushing in the aperture of the anchor plate to provide the associated pin with a smooth sliding surface. Also, it is known to install a boot seal on the pin to cover the aperture and therefore, protect the smooth sliding surface from debris. U.S. Pat. No. 5,358,079 to Brown, U.S. Pat. No. 5,183,136 to Maeda et al., U.S. Pat. No. 4,962,979 to Odaka, U.S. Pat. No. 4,308,938 to Denton, U.S. Pat. No. 4,753,326 to Weiler et al., U.S. Pat. No. 4,401,194 to Klassen, U.S. Pat. No. 4,331,221 to Evans, and U.S. Pat. No. 4,265,340 to Scott et al. disclose known slide pin bushing and/or boot seal structures.

BRIEF SUMMARY OF THE INVENTION

This invention relates to an improved structure for a slide pin bushing and boot seal assembly for use in a vehicle disc brake caliper assembly adapted to selectively frictionally engage a rotor connected to a vehicle wheel. The disc brake caliper assembly includes an anchor plate adapted to be secured to a stationary component of the vehicle, and a caliper secured to the anchor plate for sliding movement relative thereto. A pair of brake shoes are carried by the disc brake caliper assembly, and an actuation means is provided for selectively moving the brake shoes axially toward and away from one another so as to selectively frictionally engage the rotor. The slide pin bushing and boot seal assembly is carried by the disc brake caliper assembly and includes a slide pin bushing formed from a relatively hard resilient elastomeric material and a boot seal formed from a relatively soft flexible elastomeric material and joined to one end of the slide pin bushing to define an integral one-piece unit. A slide pin extends through the boot seal and at least a portion of the slide pin bushing for securing the caliper to the anchor plate for sliding movement relative thereto.

Various objects and advantages of this invention will become apparent to those skilled in the art from the following detailed description of the preferred embodiment, when read in light of the accompanying drawings.

DETAILED DESCRIPTION OF THE INVENTION

Referring now to the drawings, there is illustrated in FIGS. 1 through 4 a portion of a prior art vehicle disc brake assembly, indicated generally at 10. The general structure and operation of the disc brake assembly 10 is conventional in the art. Thus, only those portions of the disc brake assembly 10 which are necessary for a full understanding of this invention will be explained and illustrated.

The disc brake assembly 10 includes a generally C-shaped caliper, indicated generally at 11. The caliper 11 includes an inboard leg portion 12 and an outboard leg portion 13 which are interconnected by an intermediate bridge portion 14. The caliper 11 is slidably supported on a pair of slide pin bushing and boot seal assemblies, indicated generally at 15 in FIG. 4, secured to an anchor plate 16. The anchor plate 16 is in turn, secured to a stationary component of the vehicle, such as a steering knuckle (not shown) in a front wheel drive vehicle. A pair of bolts (not shown) extend through a pair of non-threaded apertures 16a provided in the anchor plate 16 to secure the anchor plate 16, and therefore the disc brake assembly 10, to the stationary vehicle component.

Figure 1:
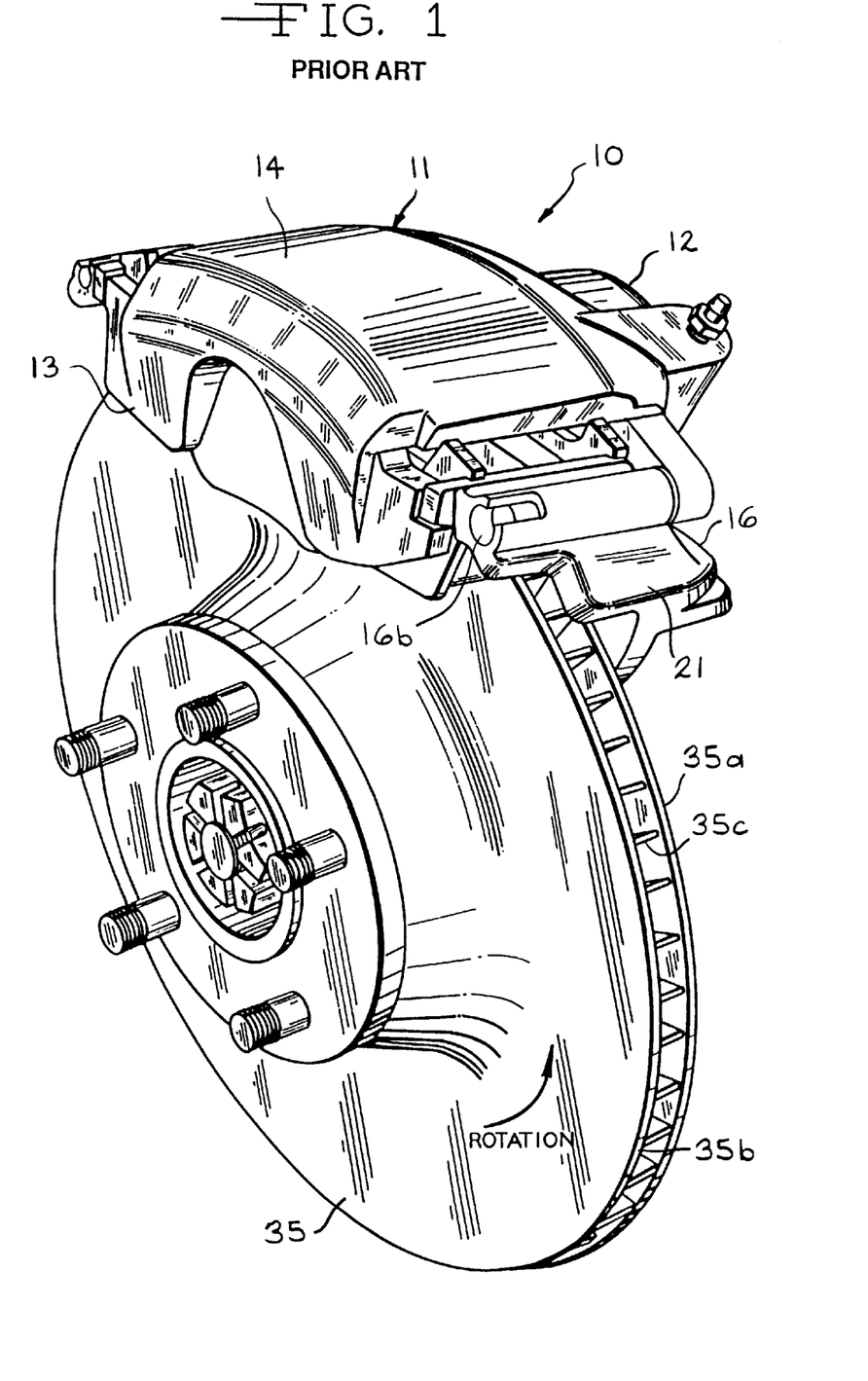
FIG. 1 is a perspective view of a portion of a prior art vehicle disc brake assembly.
Figure 2:
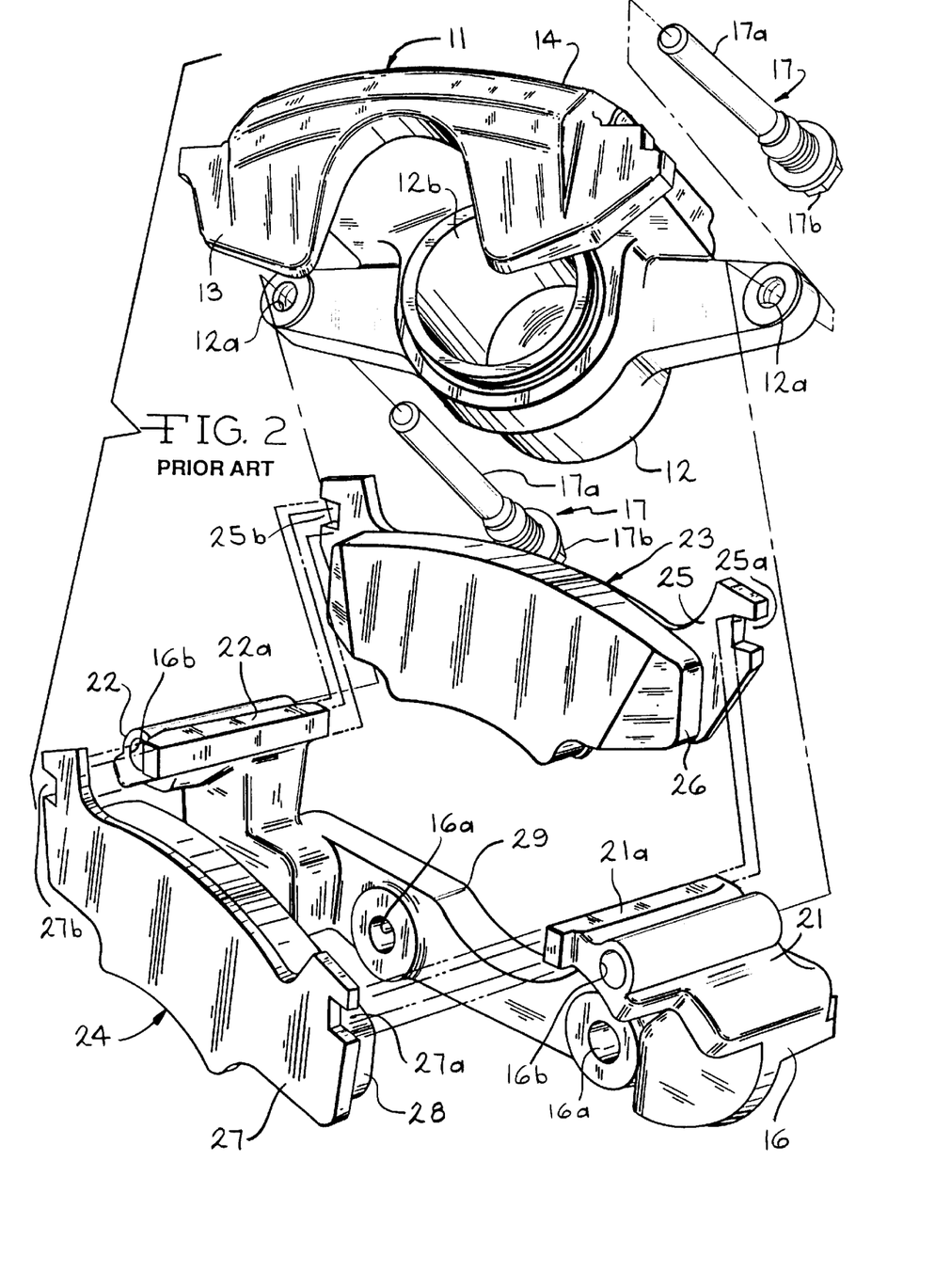
FIG. 2 is an exploded perspective view of selected portions of the prior art vehicle disc brake assembly illustrated in FIG. 1.
Figure 3:
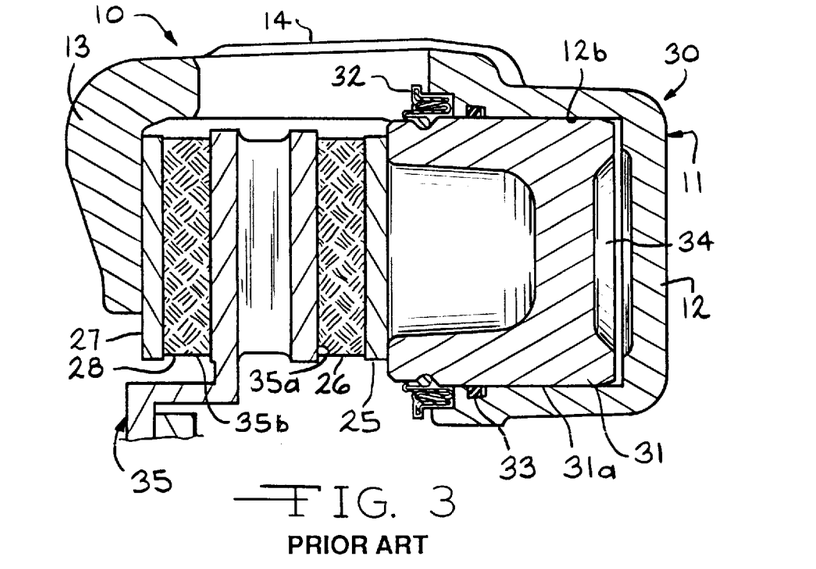
FIG. 3 is a sectional view of a portion of the prior art vehicle disc brake assembly illustrated in FIG. 1.

As best shown in FIG. 2, the illustrated anchor plate 16 includes a pair of outwardly extending arms 21 and 22 which are interconnected by an inner tie bar 29. The arms 21 and 22 have respective upstanding guide rails 21a and 22a, respectively formed thereon. The guide rails 21a and 22a extend transverse to the arms 21 and 22 and extend parallel to one another. The guide rails 21a and 22a slidably support an inboard brake shoe, indicated generally at 23, and an outboard brake shoe, indicated generally at 24, respectively.

The inboard brake shoe 23 includes a backing plate 25 and a friction pad 26. The inboard backing plate 25 includes opposed ends having notches 25a and 25b formed therein, for supporting the inboard brake shoe 23 on the guide rails 21a and 22a of the anchor plate 16. The outboard brake shoe 24 includes a backing plate 27 and a friction pad 28. The outboard backing plate 27 includes opposed ends having notches 27a and 27b formed therein, for supporting the outboard brake shoe 24 on the guide rails 21a and 22a of the anchor plate 16. Alternatively, the inboard brake shoe 23 can be supported on a brake piston, while the outboard brake shoe 24 can be supported on the outboard leg portion 13 of the caliper 11.

An actuation means, indicated generally at 30, is provided for effecting the operation of the disc brake assembly 10. The actuation means 30 includes a piston 31, which is disposed in a counterbore or recess 12b formed in the outboard surface of the inboard leg 12 of the caliper 11. The actuation means 30, shown in this embodiment as being a hydraulic actuation means, is operable to reciprocally move the piston 31 within the recess 12b. However, other types of actuation means 30, such as for example, electrical and mechanical types, can be used.

The disc brake assembly 10 also includes a dust boot seal 32 and an annular fluid seal 33. The dust boot seal 32 is formed from a flexible material and has a first end which engages an outboard end of the recess 12b. A second end of the dust boot seal 32 engages an annular groove formed in an outer side 31a wall of the piston 31. A plurality of flexible convolutions are provided in the dust boot seal 32 between the first and second ends thereof. The dust boot seal 32 is provided to prevent water, dirt, and other contaminants from entering into the recess 12b. The fluid seal 33 is disposed in an annular groove formed in a side wall of the recess 12b and engages an outer side wall 31a of the piston 31. The fluid seal 33 is provided to define a sealed hydraulic actuator chamber 34, within which the piston 31 is disposed for sliding movement. Also, the fluid seal 33 is designed to function as a "roll back" seal to retract the piston 31 within the recess 12b (right when view FIG. 3) when the brake pedal is released.

The disc brake assembly 10 further includes a rotor 35, which is connected to a wheel (not shown) of the vehicle for rotation therewith. The illustrated rotor 35 includes a pair of opposed braking discs 35a and 35b which are spaced apart from one another by a plurality of intermediate ribs or fins 35c in a known manner. The rotor 35 extends radially outwardly between the inboard friction pad 26 and the outboard friction pad 28.

Figure 4:
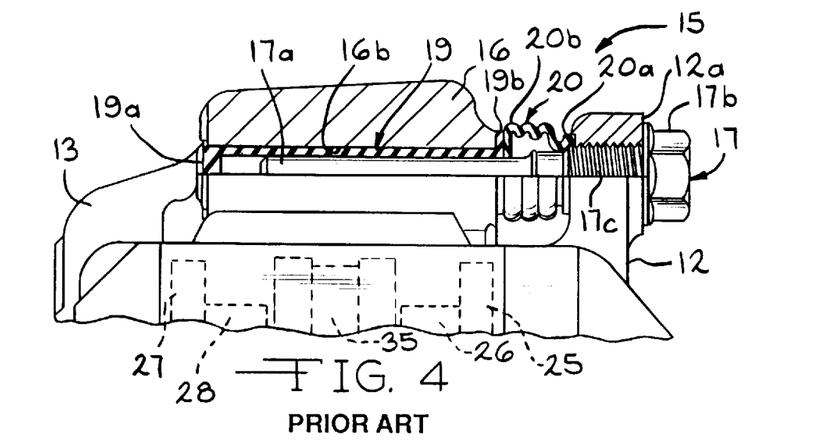
FIG. 4 is a sectional view, partially broken away, of a first embodiment of a prior art slide pin bushing and boot seal assembly for use in the prior art vehicle disc brake assembly illustrated in FIG. 1.

As shown in FIG. 4, each of the slide pin bushing and boot seal assemblies 15 includes an elongated pin 17, a resilient slide pin bushing 19, and a boot seal 20. The pin 17 is of a stepped construction and includes a non-threaded main body 17a, an increased diameter threaded portion 17c, and a hexagonally shaped outer end 17b. The slide pin bushing 19 is disposed in a non-threaded aperture 16b formed in the anchor plate 16. The slide pin bushing 19 includes a closed end 19a and a flared opened end 19b. The outer diameter of the main body 17a of the pin 17 is slightly less than the inner diameter of the slide pin busing 19 so as to allow the main body 17a of the pin 17 to be disposed within the bushing 19 for sliding movement relative thereto. The threaded portion 17c of the pin 17 is received in a threaded opening 12a formed in the inboard leg 12 of the caliper 11.

Figure 5:
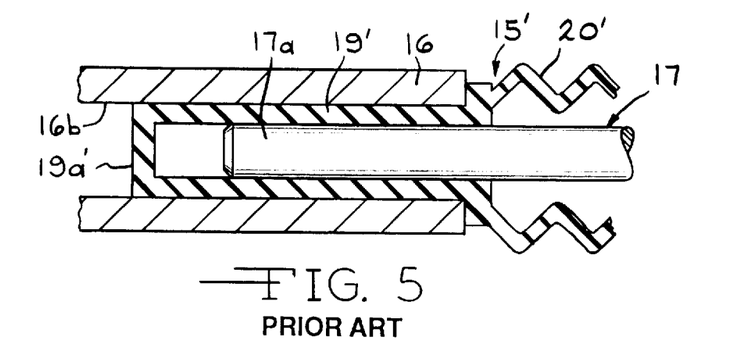
FIG. 5 is a sectional view showing a second embodiment of a prior art slide pin bushing and boot seal assembly for use in the prior art vehicle disc brake assembly illustrated in FIG. 1.

The boot seal 20 is formed from a flexible material and includes a first end 20a and a second end 20b. The first end 20a of the boot seal 20 engages an outer end of the opening 12a of the inboard leg 12 of the caliper 11 and an outer surface of the pin 17. The second end 20b of the boot seal 20 engages the flared end 19b of the slide pin bushing 19 and an outer surface of the pin 17. A plurality of flexible convolutions are provided in the boot seal 20 between the first and second ends thereof. The boot seal 20 is provided to prevent water, dirt, and other contaminants from entering into the respective non-threaded apertures 16b of the anchor plate 16. Typically, the slide pin bushing 19 is formed from a relatively hard resilient elastomeric material, and the boot seal 20 is formed from a relatively soft flexible elastomeric material. Alternatively, as shown in prior art FIG. 5, a resilient bushing portion 19' and a boot seal portion 20' may be integrally formed from as a one-piece structure 15'. The one-piece slide pin bushing and boot seal assembly 15' may be formed from an elastomeric material, such as ethylene propylene diene monomer (EPDM) having a Shore "A" hardness in the range of 55–65. The slide pin bushing and boot seal assemblies 15 and 15' permit the caliper 11 to slide in both the outboard direction (left when viewing FIGS. 1 and 3) and the inboard direction (right when viewing FIGS. 1 and 3). Such sliding movement of the caliper 11 occurs when the disc brake assembly 10 is actuated, as will be explained below.

When it is desired to actuate the disc brake assembly 10 to retard or stop the rotation of the brake rotor 35 and the vehicle wheel associated therewith, the driver of the vehicle depresses the brake pedal (not shown). In a manner which is well known in the art, the depression of the brake pedal causes pressurized hydraulic fluid to be introduced into the chamber 34. Such pressurized hydraulic fluid urges the piston 31 in the outboard direction (toward the left when viewing FIG. 3) into engagement with the backing plate 25 of the inboard brake shoe 23. As a result, the friction pad 26 of the inboard brake shoe 23 is moved into frictional engagement with the inboard braking disc 35a of the rotor 35. After inboard engagement, the caliper 11 slides on the pins 17 in the inboard direction (toward the right when viewing FIG. 3) such that the outboard leg 13 thereof moves the friction pad 28 of the outboard brake shoe 24 into frictional engagement with the outboard braking disc 35b of the brake rotor 35. As a result, the opposed axial sides of the rotor 35 are frictionally engaged by the friction pads 26 and 28 to retard relative rotational movement thereof. The structure and operation of the disc brake assembly 10 thus far described is conventional in the art.

Figure 6:
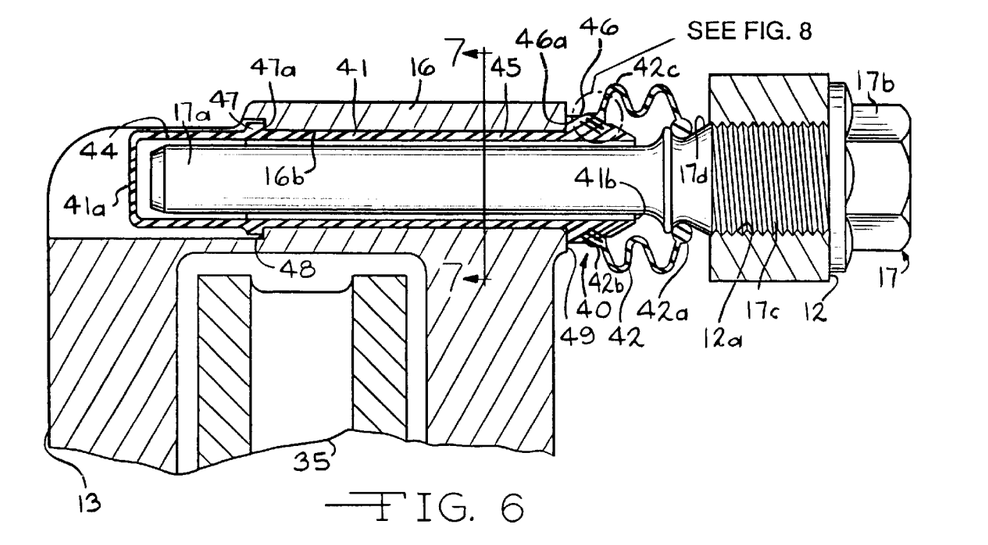
FIG. 6 is a sectional view, partially broken away, of a first embodiment of an improved slide pin bushing and boot seal assembly constructed in accordance with this invention.
Figure 7:
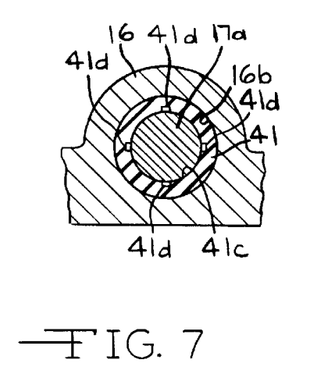
FIG. 7 is a sectional view taken along line 7—7 of FIG. 6.
Figure 8:
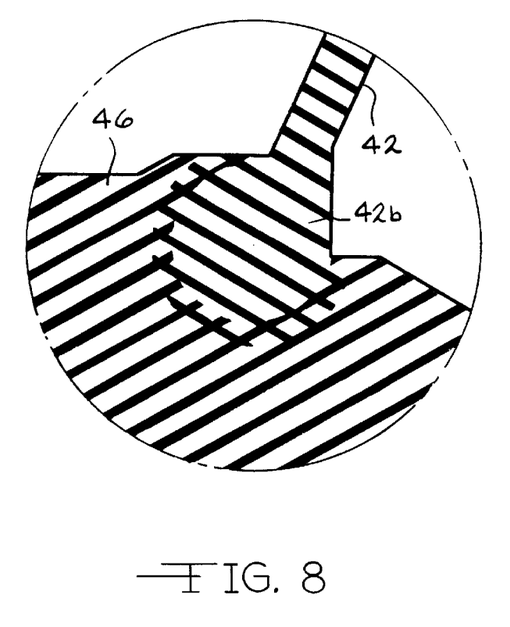
FIG. 8 is an enlarged view of a portion of the slide pin bushing and boot seal assembly illustrated in FIG. 6.

Turning now to FIGS. 6 through 8, there is illustrated a first embodiment of a slide pin bushing and boot seal assembly, indicated generally at 40, in accordance with this invention. As shown therein, the slide pin bushing and boot seal assembly 40 includes a slide pin bushing portion 41 and a boot seal portion 42. Preferably, the slide pin bushing portion 41 is formed from a relatively hard resilient elastomeric material, and the boot seal portion 42 is formed from a relatively soft flexible elastomeric material. For example, the slide pin bushing portion 41 may be formed from EPDM having a Shore "A" hardness in the range of to 70 to 90, and the boot seal portion 42 may be formed from EPDM having a Shore "A" hardness in the range of 50–65. Preferably, the slide pin bushing portion 41 is formed from EPDM having a Shore "A" hardness of approximately 80, and the boot seal portion 42 is formed form EPDM having a Shore "A" hardness of approximately 60. The slide pin bushing portion 41 and the boot seal portion 42 are preferably formed integrally with one another during a molding process.

The slide pin bushing portion 41 is disposed in the non-threaded aperture 16b formed in the anchor plate 16, and includes a closed end 41a and an opened end 41b. The slide pin bushing portion 41 includes an inner surface 41c which engages an outer surface of the inner end 17a of the pin 17. The inner surface 41c of the slide pin bushing portion 41 is preferably provided with a plurality of longitudinally extending slots 41d formed therein for installation purposes, as shown in FIG. 7.

The slide pin bushing portion 41 is segmented into three sections, namely, an outer end section 44, an intermediate section 45, and an inner end section 46. A generally annular raised rib 47 is formed at the transition between the outer end section 44 and the intermediate section 45. The raised rib 47 defines a first radially extending sleeve shoulder 47a. The slide pin bushing portion 41 also includes a generally annular raised rib 46a which defines a second radially extending sleeve shoulder between the intermediate section 45 and the inner end section 46. When the slide pin bushing portion 41 is installed in the non-threaded aperture 16b of the anchor plate 16, the first sleeve shoulder 47a engages a radially extending outer shoulder 48 formed on the anchor plate 16 about one of the aperture 16b, and the second sleeve shoulder 46a engages a radially extending inner end surface 49 formed on the anchor plate 16 about the opposite end of the aperture 16b. Thus, the slide pin bushing portion 41, and therefore the slide pin bushing and boot seal assembly 40, is fixed in the aperture 16b of the anchor plate 16.

The boot seal portion 42 of the slide pin bushing and boot seal assembly 40 includes a first end 42a, a second end 42b, and a plurality of flexible convolutions 42c formed between the first end 42a and the second end 42b. In the illustrated embodiment, the first end 42a of the boot seal portion 42 is disposed about and engages an outer surface of a portion 17d of the pin 17. The second end 42b of the boot seal portion 42 is integrally formed with or joined to the slide pin bushing portion 41 adjacent the opened end 41b thereof during the molding process, as shown in FIG. 8.

Figure 9:
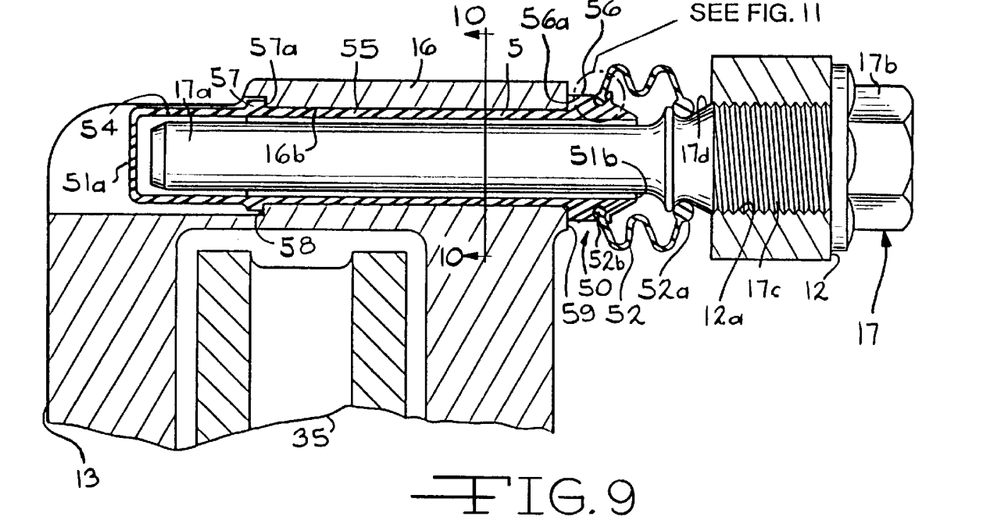
FIG. 9 is a sectional view, partially broken away, of a second embodiment of a slide pin bushing and boot seal assembly constructed in accordance with this invention.
Figure 10:
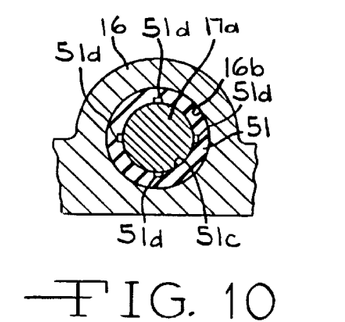
FIG. 10 is a sectional view taken along line 10—10 of FIG. 9.
Figure 11:
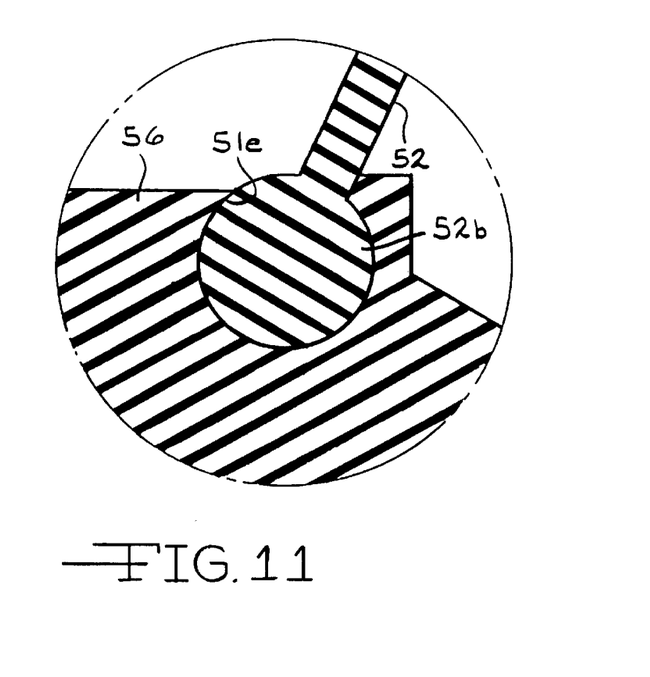
FIG. 11 is an enlarged view of a portion of the slide pin bushing and boot seal assembly illustrated in FIG. 9.

Turning now to FIGS. 9 through 11, there is illustrated a second embodiment of a slide pin bushing and boot seal assembly, indicated generally at 50, in accordance with this invention. As shown therein, the slide pin bushing and boot seal structure 50 includes a slide pin bushing portion 51 and a boot seal portion 52. The slide pin bushing portion 51 is formed from a relatively hard resilient elastomeric material, and the boot seal portion 52 is formed from a relatively soft flexible elastomeric material. For example, the slide pin bushing portion 51 may formed from EPDM having a Shore "A" hardness in the range of to 70 to 90, and the boot seal portion 52 may be formed from EPDM having a Shore "A" hardness in the range of 50–65. Preferably, the slide pin bushing portion 51 is formed from EPDM having a Shore "A" hardness of approximately 80, and the boot seal portion 52 is formed form EPDM having a Shore "A" hardness of approximately 60.

The slide pin bushing portion 51 is disposed in the non-threaded aperture 16b formed in the anchor plate 16 and includes a closed end 51a and an opened end 51b. The slide pin bushing portion 51 includes an inner surface 51c which preferably is provided with a plurality of longitudinally extending slots 51d formed therein for installation purposes, as shown in FIG. 10. In this embodiment, the slide pin bushing portion 51 includes a generally annular groove 51e (see FIG. 11) formed therein adjacent the opened end 51b.

The slide pin bushing portion 51 is segmented into three sections, namely, an outer end section 54, an intermediate section 55, and an inner end section 56. A generally annular raised rib 57 is formed at the transition between the outer end section 54 and the intermediate section 55. The raised rib 57 defines a first radially extending sleeve shoulder 57a. The slide pin bushing portion 51 also includes a generally annular raised rib 56a which defines a second radially extending sleeve shoulder between the intermediate section 55 and the inner end section 56. When the slide pin bushing portion 41 is installed in the non-threaded aperture 16b of the anchor plate 16, the first sleeve shoulder 57a engages a radially extending outer shoulder 58 formed on the anchor plate 16 about one end of the aperture 16b, and the second sleeve shoulder 56a engages a radially extending inner end surface 59 formed on the anchor plate 16 about an opposite end of the aperture 16b. Thus, the slide pin bushing portion 51, and therefore the slide pin bushing and boot seal assembly 40, is fixed in the aperture 16b of the anchor plate 16.

The boot seal portion 52 of the slide pin bushing and boot seal assembly 40 includes a first end 52a and a second end 52b. The first end 52a of the boot seal portion 52 is disposed about and engages a surface outer of a portion 17c of pin 17. The second end 52b of the boot seal portion 52 is disposed in the groove 51e of the slide pin bushing portion 51, as shown in FIG. 11. To accomplish this, the second end 52b of the boot seal portion 52 is preferably provided with a shape which generally corresponds to the shape of the groove 51e formed in the slide pin bushing portion 51. If it is desired to permanently join the second end 52b of the boot seal portion 52 to the inner end section 56 of the slide pin bushing portion 51, adhesive, heat, or other means can be used.

Figure 12:
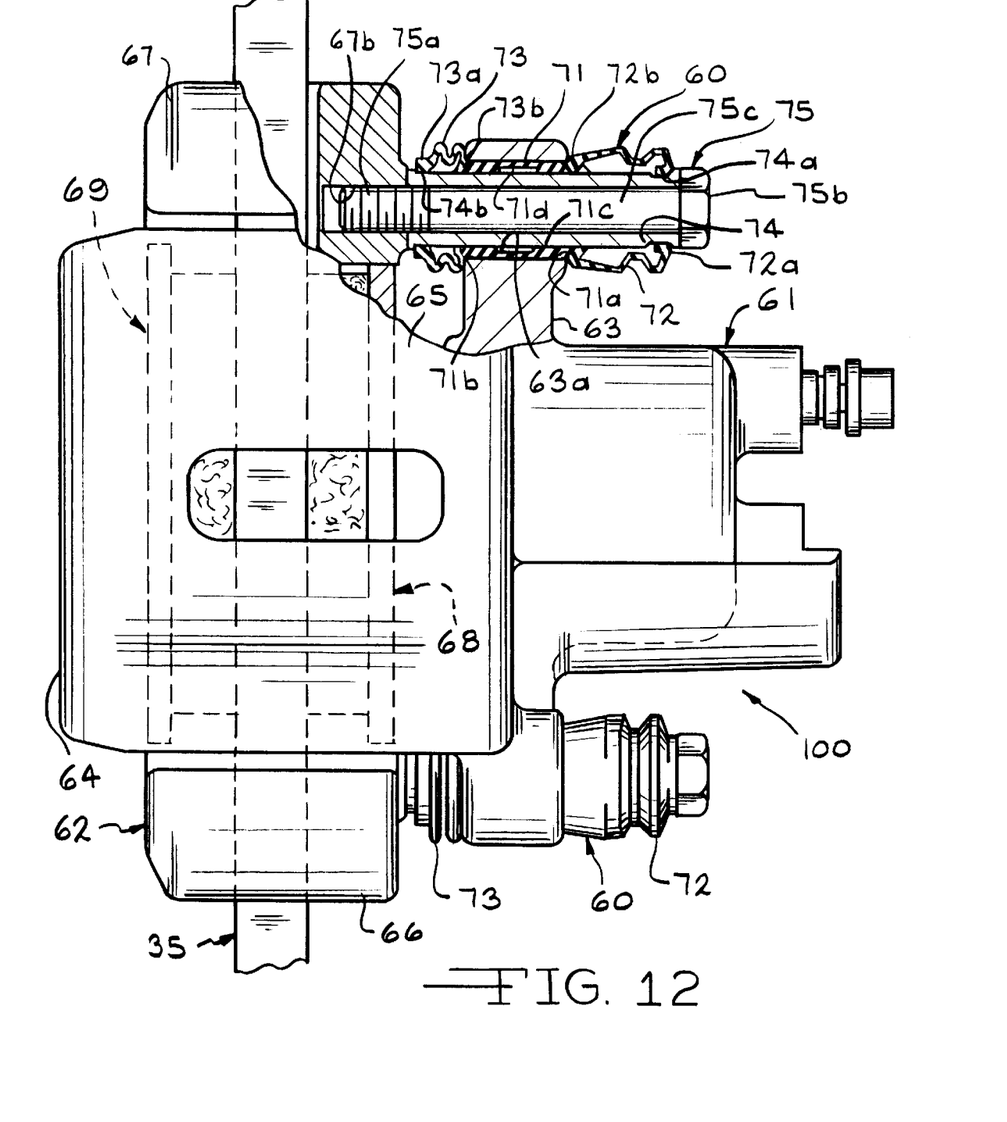
FIG. 12 is a sectional view, partially broken away, of a portion of a disc brake assembly having a third embodiment of a slide pin bushing and boot seal assembly constructed in accordance with this invention.

Turning now to FIG. 12, there is illustrated a disc brake assembly, indicated generally at 100, having a third embodiment of a slide pin bushing and boot seal assembly, indicated generally at 60, in accordance with this invention. As shown therein, the disc brake assembly 100 includes a generally C-shaped caliper 61 and an anchor plate 62. The caliper 61 includes an inboard leg portion 63 and an outboard leg portion 64 which are interconnected by an intermediate bridge portion 65.

The anchor plate 62 includes a pair of arms 66 and 67 provided with pairs of notches (not shown) formed therein to slidably support an inboard brake shoe 68 and an outboard brake shoe 69. The inboard end of the arm 67 is provided with a threaded aperture 67b, and the inboard end of the arm 66 is provided with a threaded aperture (not shown).

The caliper 61 is slidably supported relative to the anchor plate 62 by the slide pin bushing and boot seal assemblies 60. Each slide pin bushing and boot seal assembly 60 includes an intermediate slide pin bushing portion 71, and a pair of opposed end boot seal portions 72 and 73. The slide pin bushing portion 71 is formed from a relatively hard resilient elastomeric material, and the boot seal portions 72 and 73 are formed from a relatively soft flexible elastomeric material. For example, the intermediate slide pin bushing portion 71 may be formed from EPDM having a Shore "A" hardness in the range of to 70 to 90, and the boot seal portions 72 and 73 may be formed from EPDM having a Shore "A" hardness in the range of 50–65. Preferably, the intermediate slide pin bushing portion 71 is formed form EPDM having a Shore "A" hardness of approximately 80, and the boot seal portions 72 and 73 are formed from EPDM having a Shore "A" hardness of approximately 60.

The intermediate slide pin bushing portion 71 of the slide pin bushing and boot seal assembly 60 is installed in a non-threaded opening 63a formed in the inboard leg 63 of the caliper 61. As illustrated in this embodiment, a hollow cylindrical sleeve 74, preferably formed from steel, is installed within the slide pin bushing and boot seal assembly 60. The sleeve 74 includes a first outer annular recess 74a for receiving a first end 72a of the boot seal portion 72 and a second outer annular recess 74b for receiving an first end 73a of the boot seal portion 73. The intermediate slide pin bushing portion 71 includes an inner surface 71c which preferably is provided with an annular recess 71d formed therein for installation purposes.

The boot seal portion 72 further includes a second end 72b which is joined to an end 71a of the intermediate slide pin bushing portion 71. The second end 72b can be joined to the end 71a of the intermediate slide pin bushing portion 71 either by being formed integrally therewith in a manner similar to that illustrated and described herein in conjunction with FIGS. 6 through 8, or by being joined in a manner similar to that illustrated and described herein in conjunction with FIGS. 9 through 11. Similarly, the boot seal portion 73 includes a second end 73b which is joined to an end 71b of the intermediate slide pin bushing portion 71. The second end 73b can be joined to the end 71b of the intermediate slide pin bushing portion 71 either by being formed integrally therewith in a manner similar to that illustrated and described herein in conjunction with FIGS. 6 through 8, or by being joined in a manner similar to that illustrated and described herein in conjunction with FIGS. 9 through 11.

A pin 75 is provided to slidably support the caliper 61 relative to the anchor plate 62. The pin 75 includes a threaded outer end 75a, a non-threaded main body 75c, and a hexagon inner head 75b. The pin 75 extends through the sleeve 74 such that the threaded outer end 75a thereof is received in the threaded aperture 67b of the anchor plate 67 to slidably support the caliper 61 relative to the anchor plate 62. Alternatively, the anchor plate 62 may be formed as part of a stationary component of the vehicle, such as a steering knuckle (not shown). In this case, the steering knuckle includes a pair of arms having notches and threaded apertures similar to those described above in connection with the anchor plate 62.

Although the invention has been described and illustrated in connection with the particular disc brake assembly structures disclosed herein, it will be appreciated that this invention may be used in connection with other types of disc brake assembly structures.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A brake assembly comprising:

an anchor plate having an aperture formed therein;

a caliper having a slide pin extending therefrom, said slide pin extending through said aperture of said anchor plate so as to support said caliper on said anchor plate for sliding movement relative thereto;

a pair of brake shoes carried by said caliper;

actuation means for selectively moving said brake shoes toward and away from one another; and a slide pin bushing and boot seal assembly including a slide pin bushing portion formed from a relatively hard resilient elastomeric material and a boot seal portion formed from a relatively soft flexible elastomeric material, said slide pin bushing portion being disposed within said aperture of said anchor plate about said slide pin, said slide pin bushing portion including an outer end section, an intermediate section, and an inner end section, said slide pin bushing portion provided with a generally annular raised rib formed at the transition between said outer end section and said intermediate section which defines a first radially extending sleeve shoulder, said slide pin bushing provided with a generally annular raised rib formed at the transition between said intermediate section and said inner end section which defines a second radially extending sleeve shoulder, said boot seal portion having a first end joined to one end of said slide pin bushing portion to define an integral one-piece unit and a second end mounted for movement with said slide pin and caliper.

2. The disc brake caliper assembly defined in claim 1 wherein said slide pin bushing portion is formed from an elastomeric material having a Shore "A" hardness in the range of 70 to 90, and said boot seal portion is formed from an elastomeric material having a Shore "A" hardness in the range of 50 to 65.

3. The disc brake caliper assembly defined in claim 1 wherein said slide pin bushing portion and said boot seal portion are formed integrally with one another during a molding process.

4. The disc brake caliper assembly defined in claim 1 wherein said slide pin bushing portion includes a closed end, an opened end, and an inner surface, said inner surface provided with a longitudinally extending slot formed therein.

5. The disc brake caliper assembly defined in claim 1 wherein said slide pin bushing portion includes a closed end, an opened end, and a generally annular groove formed therein adjacent one of said closed end and said opened end, one of said first end and said second end of said boot seal portion having a shape which generally corresponds to the shape of said groove formed in said slide pin bushing portion to allow said one of said first end and said second end of said boot seal portion to be disposed in said groove of said slide pin bushing portion to thereby join said slide pin bushing portion to said boot seal portion.

6. A slide pin bushing and boot seal assembly adapted for use with a brake assembly comprising:

a slide pin bushing portion formed from a relatively hard resilient elastomeric material and a boot seal portion formed from a relatively soft flexible elastomeric material, said slide pin bushing portion adapted to be disposed within an aperture of an anchor plate of the brake assembly about a slide pin of the brake assembly, said slide pin bushing portion including an outer end section, an intermediate section, and an inner end section, said slide pin bushing portion provided with a generally annular raised rib formed at the transition between said outer end section and said intermediate section which defines a first radially extending sleeve shoulder, said slide pin bushing provided with a generally annular raised rib formed at the transition between said intermediate section and said inner end section which defines a second radially extending sleeve shoulder, said boot seal portion having a first end joined to one end of said slide pin bushing portion to define an integral one-piece unit and a second end adapted for movement with the slide pin and caliper of the brake assembly.

7. The slide pin bushing and boot seal assembly defined in claim 6 wherein said slide pin bushing portion is formed from an elastomeric material having a Shore "A" hardness in the range of 70 to 90, and said boot seal portion is formed from an elastomeric material having a Shore "A" hardness in the range of 50 to 65.

8. The slide pin bushing and boot seal assembly defined in claim 6 wherein said slide pin bushing portion and said boot seal portion formed integrally with one another during a molding process.

9. The disc brake caliper assembly defined in claim 6 wherein said slide pin bushing portion includes a closed end, an opened end, and an inner surface, said inner surface provided with a longitudinally extending slot formed therein.

10. A slide pin bushing and boot seal assembly adapted for use with a brake assembly comprising:

a slide pin bushing portion formed from a relatively hard resilient elastomeric material and a boot seal portion formed from a relatively soft flexible elastomeric material, said slide pin bushing portion adapted to be disposed within an aperture of an anchor plate of the brake assembly about a slide pin of the brake assembly, said slide pin bushing portion including a closed end, an opened end, and a generally annular groove formed therein adjacent one of said closed end and said opened end, said boot seal portion having a first end joined to one end of said slide pin bushing portion to define an integral one-piece unit and a second end adapted for movement with the slide pin and caliper of the brake assembly, said boot seal portion including a first end and a second end, one of said first end and said second end of said boot seal portion having a shape which generally corresponds to the shape of said groove formed in said slide pin bushing portion to allow said one of said first end and said second end of said boot seal portion to be disposed in said groove of said slide pin bushing portion to thereby join said slide pin bushing portion to said boot seal portion.

11. The slide pin bushing and boot seal assembly defined in claim 10 wherein said slide pin bushing is an intermediate slide pin bushing, said boot seal is a first boot seal joined to one end of said intermediate slide pin bushing, and a second boot seal is joined to an opposite end of said intermediate slide pin bushing to define an integral one-piece unit.

12. The slide pin bushing and boot seal assembly defined in claim 11 wherein said intermediate slide pin bushing portion and said pair of opposed end boot seal portions are formed integrally with one another during a molding.

13. The disc brake caliper assembly defined in claim 10 wherein said slide pin bushing portion includes an inner surface provided with an annular recess formed therein.

* * * * *